(12) United States Patent
Bauer

(10) Patent No.: US 6,452,909 B1
(45) Date of Patent: Sep. 17, 2002

(54) TIME DIVISION DUPLEX TRANSCEIVER UTILIZING A SINGLE OSCILLATOR

(75) Inventor: Avi Bauer, Kfar Saba (IL)

(73) Assignee: Texas Instruments Israel Ltd., Kfar Saba (IL)

( * ) Notice: Subject to any disclaimer, the term of this patent is extended or adjusted under 35 U.S.C. 154(b) by 0 days.

(21) Appl. No.: 09/122,281

(22) Filed: Jul. 24, 1998

(51) Int. Cl.[7] .................................................. H04L 5/14
(52) U.S. Cl. ...................................... 370/280; 370/294
(58) Field of Search .............................. 370/276, 279, 370/280, 281, 294, 295, 339; 455/75, 76, 83, 84, 85, 86, 87; 375/219, 220

(56) References Cited

U.S. PATENT DOCUMENTS

| | | | |
|---|---|---|---|
| 2,556,296 A | 6/1951 | Rack | |
| 3,775,696 A | 11/1973 | Garth | |
| 3,899,755 A | 8/1975 | Uchida | |
| 3,909,748 A | 9/1975 | Yuan et al. | |
| 4,010,428 A | 3/1977 | Sunkler | |
| 4,061,973 A | 12/1977 | Reimers et al. | |
| 4,238,850 A | 12/1980 | Vance | |
| 4,353,038 A | 10/1982 | Rose et al. | |
| 4,378,534 A | 3/1983 | Goedken et al. | |
| 4,503,401 A | 3/1985 | Kyriakos et al. | |
| 4,520,474 A | 5/1985 | Vilmur | |
| 4,536,724 A | 8/1985 | Hasegawa et al. | |
| 4,694,262 A | 9/1987 | Inoue et al. | |
| 4,779,063 A | 10/1988 | Nagaoka | |
| 4,969,210 A | 11/1990 | Hansen et al. | |
| 4,998,077 A | 3/1991 | Nanni et al. | |
| 5,123,088 A | 6/1992 | Beesley | |
| 5,319,799 A | * 6/1994 | Morita | ........................ 455/78 |
| 5,327,106 A | 7/1994 | Sanders | |
| 5,629,652 A | 5/1997 | Weiss | |
| 5,657,344 A | * 8/1997 | Na | .............................. 375/219 |
| 5,689,819 A | 11/1997 | Nishimura et al. | |
| 5,714,915 A | 2/1998 | Brilka | |
| 6,226,276 B1 | * 5/2001 | Na | .............................. 370/294 |

OTHER PUBLICATIONS

H.L. Krauss et al., Solid State Engineering, 1980.

* cited by examiner

Primary Examiner—Min Jung
(74) Attorney, Agent, or Firm—Darby & Darby, PC; Howard Zaretsky, Esq.

(57) ABSTRACT

A single voltage controlled oscillator (VCO) running at a closed loop controlled fundamental frequency whereby the harmonic products generated by the VCO are used for both transmission and reception. The use of a single VCO and associated supporting circuitry for both transmit and receive portions of the circuit serves to reduce the cost of the transceiver. The radio transceiver comprises a single synthesized oscillator having high harmonic content. The frequency conversions in the receiver make use of the harmonic frequency components of the same oscillator used in performing modulation during transmission.

21 Claims, 4 Drawing Sheets

TIME DIVISION DUPLEX TRANSCEIVER UTILIZING A SINGLE OSCILLATOR

FIELD OF THE INVENTION

The present invention relates generally to a radio frequency (RF) communication transceiver, and more particularly relates to a transceiver, such as a Frequency Shift Keying (FSK) transceiver, which employs Time Division Duplexing (TDD) to support full duplex wireless communications.

BACKGROUND OF THE INVENTION

Currently, high frequency radio frequency (RF) communications are becoming more and more prevalent in the world today. Products touting wireless RF communication links are becoming increasingly popular among consumers. Today, there are an increasing number of new products, including redesigned existing ones, being designed incorporating wireless RF links.

Most of the RF communication circuits found in wireless products employ some form of oscillator and synthesizer circuitry in their transceivers. Due to the explosive consumer demand for products sporting wireless communication links, there is a need for low cost transceivers that are suitable for mass manufacture.

In addition, the sharing of certain elements between several functions in radio communications transceiver provides a reduction in cost and size, both of which are desirable.

Radio communication TDD transceivers that share at least one element are known in the art. U.S. Pat. No. 5,689,819, issued to Nishimura et al., discloses a transceiver wherein a quartz crystal oscillator is used as a common reference signal for the local oscillators in the receive section of the transceiver and for the generation of the carrier signal for use in the transmit portion of the transceiver. The output signal of the quartz crystal oscillator is input to three separate VCOs used to generate the LO signal for the transmitter, the first LO signal for the first IF stage and the second LO signal for the second IF state. A disadvantage of this transceiver is that although the quartz crystal oscillator is shared, an independent VCO is used to generate each LO signal. the quartz crystal oscillator is shared, an independent VCO is used for the generation of each LO signal.

U.S Pat. No. 5,123,008, issued to Beesley, discloses a time division duplex transceiver wherein the first receiver local oscillator in a dual conversion superheterodyne receiver doubles as the frequency source for the transmitter. A selected harmonic of a separately generated second receiver local oscillator signal is used to derive the LO for the second receiver. Here too, a disadvantage is that multiple oscillators are required to generate the LOs used in the transceiver.

SUMMARY OF THE INVENTION

The present invention provides the ability to create a complete communications transceiver utilizing a single oscillator for both transmitting and receiving without comprising performance over other designs that incorporate more than one oscillator. The radio transceiver comprises a single synthesized oscillator having high harmonic content. The transceiver also comprises a power amplifier on the transmit path. On the receive path, the transceiver comprises a low noise amplifier (LNA), a plurality of frequency conversion mixers and a demodulator.

A key feature of the present invention includes the implementation of a single voltage controlled oscillator (VCO) running at a closed loop controlled fundamental frequency whereby the harmonic products generated by the VCO are used for both transmission and reception. The use of a single VCO and associated supporting circuitry for both transmit and receive portions of the circuit serves Lo reduce the cost of a transceiver.

It is important to note that the principle of utilizing the fundamental and harmonic frequencies of a single oscillator can be applied to a transceiver regardless of the type of modulation scheme employed, e.g., FSK, BPSK, ASK, M-ary modulation, QAM, QPSK, etc.

There is provided in accordance with the present invention a time division duplex (TDD) transceiver comprising oscillation means for generating a fundamental frequency and a plurality of harmonic frequencies, wherein the oscillation means employs a single voltage controlled oscillator (VCO), transmitter means for generating a transmit output signal in response to a Tx data input signal, the transmitter means utilizing one or more carrier signals derived from the oscillation means and receiver means for receiving and demodulating a received. signal and in response thereto, generating an Rx output signal, the receiver means utilizing one or more local oscillator signals derived from the oscillation means.

The oscillation means comprises a frequency synthesizer coupled to the output of the VCO, the frequency synthesizer having a control input and a reference input, a loop filter connected to the output of the frequency synthesizer, an adder for receiving the Tx data input and for generating a control signal input to the VCO and wherein the VCO is adapted to generate the fundamental frequency and the plurality of harmonic frequencies.

The oscillation means comprises a frequency synthesizer coupled to the output of the VCO, the frequency synthesizer having a control input and a reference input, a loop filter connected to the output of the frequency synthesizer, an adder for receiving the Tx data input and generating a control signal input to the VCO and an equalizer coupled to the output of the VCO for providing the desired frequency spectra output for the fundamental frequency and the plurality of harmonic frequencies.

The oscillation means comprises a frequency synthesizer coupled to the output of the VCO, the frequency synthesizer having a control input and a reference input, a loop filter connected to the output of the frequency synthesizer, the loop filter operative to generate a control signal input to the VCO and wherein the VCO is adapted to generate the fundamental frequency and the plurality of harmonic frequencies.

The oscillation means comprises a frequency synthesizer coupled to the output of the VCO, the frequency synthesizer having a control input and a reference input, a loop filter connected to the output of the frequency synthesizer, the loop filter operative to generate a control signal input to the VCO and an equalizer coupled to the output of the VCO for providing substantially flat frequency response output for the fundamental frequency and the plurality of harmonic frequencies.

The transmitter means is adapted to generate either an FSK signal or a BPSK signal.

There is also provided in accordance with the present invention a time division duplex (TDD) transceiver comprising oscillation means for generating a fundamental frequency, and its harmonics, wherein the oscillation means employs a single voltage controlled oscillator (VCO), transmitter means for generating a transmit output signal modulated by a Tx data input signal, the transmitter means utilizing one of the harmonic frequency components derived from the oscillation means and receiver means for receiving and demodulating a received signal so as to generate an Rx output signal, the receiver means utilizing the fundamental and the harmonics derived from the oscillation means.

The transmitter means is adapted to generate either an FSK signal, a Binary Phase Shift Keying (BPSK) signal, a Quadrature Phase Shift Keying (QPSK) signal or a Quadrature Amplitude Modulation (QAM) signal.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

| Term | Definition |
| --- | --- |
| ASK | Amplitude Shift Keying |
| BPF | Band Pass Filter |
| BPSK | Binary Phase Shift Keying |
| FSK | Frequency Shift Keying |
| IF | Intermediate Frequency |
| LNA | Low Noise Amplifier |
| LO | Local Oscillator |
| PLL | Phase Locked Loop |
| PSK | Phase Shift Keying |
| QAM | Quadrature Amplitude Modulation |
| QPSK | Quadrature Phase Shift Keying |
| RF | Radio Frequency |
| TDD | Time Division Duplex |
| VCO | Voltage Controlled Oscillator |

Figure 1:
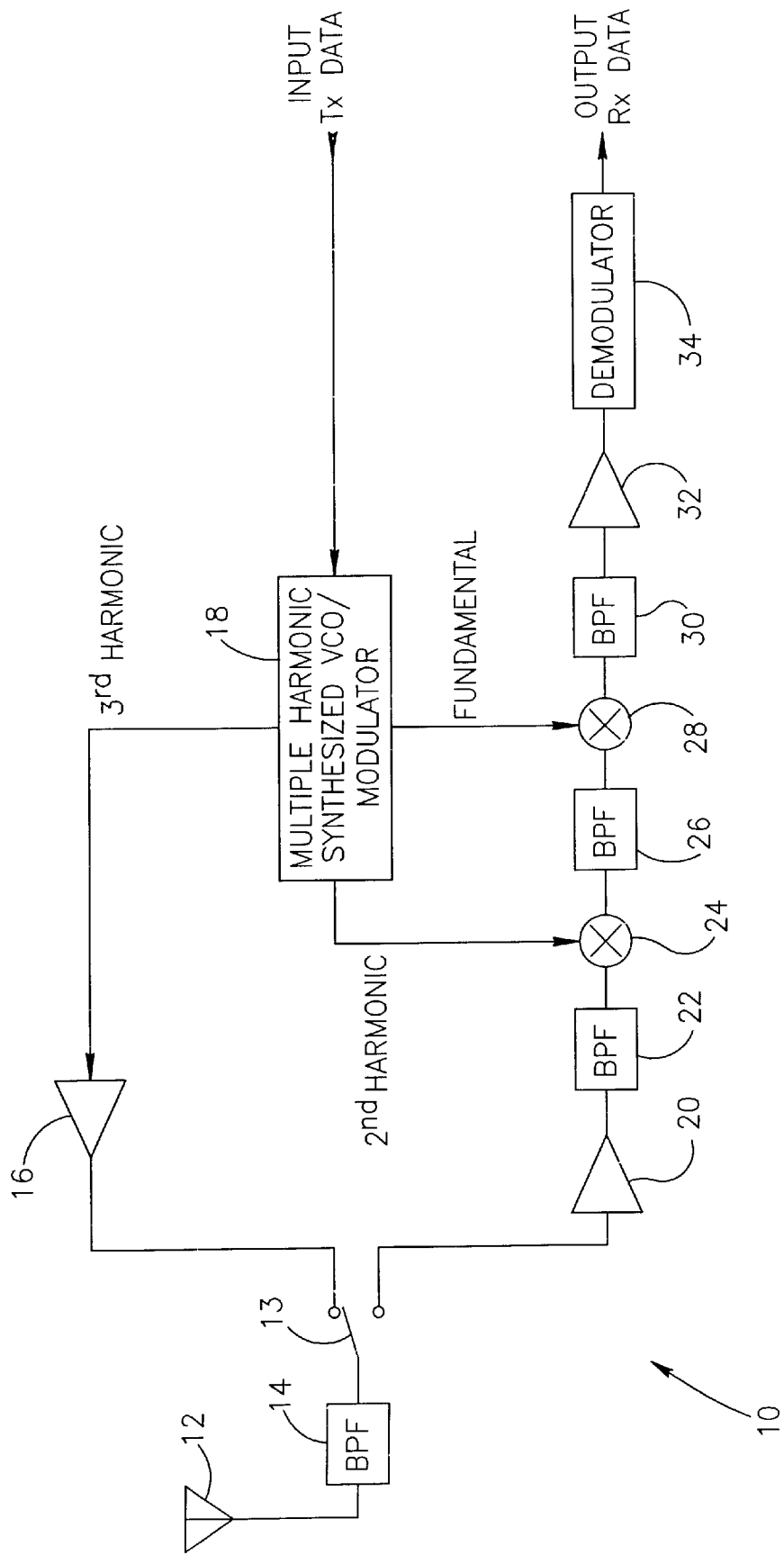
FIG. 1 is a block diagram illustrating a digital transceiver utilizing a single oscillator constructed in accordance with the present invention.

A block diagram illustrating an FSK transceiver utilizing a single oscillator constructed in accordance with the present invention is shown in FIG. 1. The transceiver, generally referenced comprises a transmit portion and a receive portion. The multiple harmonic synthesized VCO/modulator component is shared by both transmit and receive portions. In addition, the transmit portion comprises a power amplifier 16.

A common design goal for communication transceivers is to reduce the cost of the transceiver. This can be accomplished by reducing the component count. In a time division duplex (TDD) transceiver, the transmit path and receive path are not active at the same time. Thus, the receiver does not receive while the transmitter is transmitting and vice versa.

A key feature of the present invention is that it is possible to use the same oscillator for receiving and transmitting when implementing a TDD based transceiver. The TDD based transceiver may be adapted to transmit and receive any type of digital modulation scheme. Within the TDD transceiver, the same oscillator can be shared since reception and transmission do not occur simultaneously.

Note that the transceiver shown in FIG. 1 is adapted to transmit and receive FSK signals and is presented as an example to illustrate the principles of the present invention. One skilled in the RF communication arts can apply the principle of utilizing one or more harmonics generated by a single oscillator to other transmitter, receiver or transceiver configurations employing various types of modulation.

The data to be transmitted, i.e., Tx data, is input to the synthesized VCO/modulator that functions to generate a modulated transmit signal. The output signal is generated utilizing the $3^{rd}$ harmonic of the output of the single oscillator as the carrier signal for the transmitter. The output of the power amplifier is input to the single pole double throw switch 13 which functions to switch the coupling of the antenna 12 between the receive portion and the transmit portion of the transceiver 10. In FIG. 1, the switch 13 is shown in the transmit position whereby the output of the power amplifier is input to the band pass filter (BPF) 14. The signal output of the BPF 14 is input to the antenna 12.

The receive signal path of the transceiver 10 comprises the antenna 12, BPF 14, switch 13, low noise amplifier (LNA) 20, BPF 22, down converter (mixer) 24, first intermediate frequency (IF) BPF 26, second mixer 28, second IF BPF 30 and demodulator 34. The second harmonic frequency of the output of the single oscillator is used as the local oscillator signal for the down converter mixer 24. The fundamental frequency of the output of the single oscillator is used as the local oscillator signal for the second mixer 28.

To aid in understanding the principles of the present invention, examples of actual frequencies will be given. For example, let the oscillator fundamental frequency within the synthesized VCO equal 800 MHz. The second and third harmonic frequencies are, therefore, 1.6 and 2.4 GHz, respectively. During transmission, the third harmonic, i.e., 2.4 GHz, is used as the carrier signal for modulating the input Tx data so as to generate a FSK output signal.

During reception of a signal at 800 MHz, the single oscillator within the synthesized VCO is adapted to generate a signal whose fundamental frequency is shifted by approximately 1 MHz, i.e., to 799 MHz. Thus, the second harmonic frequency is 1,598 MHz. This signal is applied to the down converter 24. The fundamental frequency of 799 MHz is applied to the second mixer 28. The result is that a 2.4 GHz received input signal is mixed down to 3 MHz.

This signal is then input to the demodulator 34 which functions to reproduce, i.e., recover, the transmitted baseband signal. The demodulator may comprise any suitable circuit appropriately adapted to demodulate the received signal in accordance with the modulation technique employed by the transceiver. For example, in a transceiver designed to receive a FSK modulated signal, the demodulator may comprise a discriminator and a slicer or, alternatively, a PLL and a slicer, both of which may be used to generate the transmitted baseband signal. The discriminator may comprise a quadrature detector or equivalent circuit.

Figure 2:
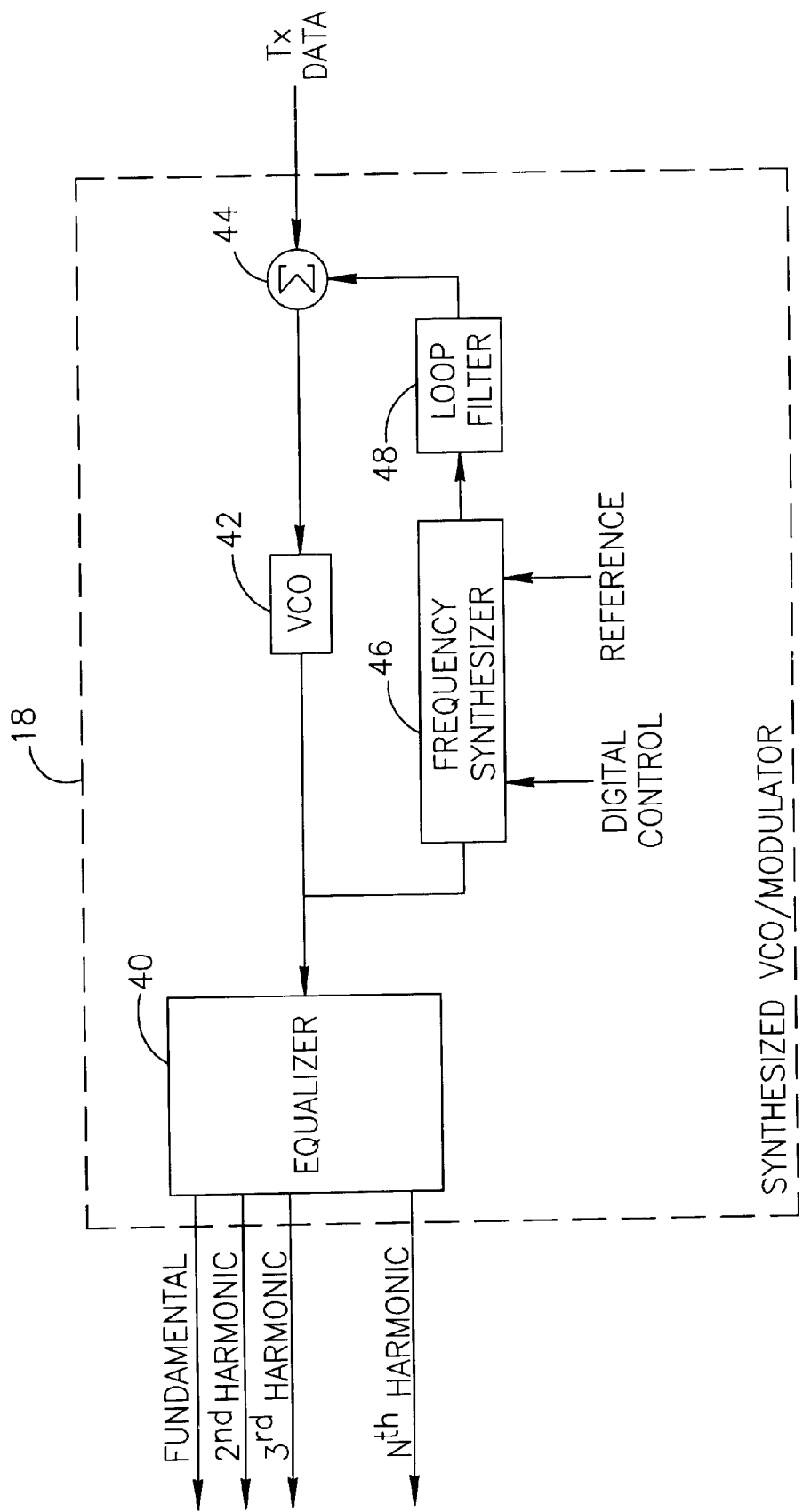
FIG. 2 is a block diagram illustrating the synthesized VCO/modulator portion of the transceiver adapted for FSK modulation in more detail.

A block diagram illustrating the synthesized VCO/modulator portion of an FSK transceiver in more detail is shown in FIG. 2. The synthesized VCO, generally referenced 18, is capable of generating a plurality of harmonic frequencies. The synthesized VCO comprises a VCO 42, frequency synthesizer or phase locked loop (PLL) 46 and loop filter 48. Modulation of the input Tx data is performed via summer 44 placed in the loop between the loop filter and the VCO. The synthesized VCO is PLL controlled in order to generate an accurate fundamental frequency. The fundamental frequency can be selected via the digital control input to the PLL 46. A digital reference frequency is also input to the PLL 46.

The output of the frequency synthesizer 46 is input to the loop filter 48. The output of the loop filter is input to summer 44 which functions to modify the output of the loop filter in accordance with the input Tx data thus performing FSK modulation. To frequency modulate the transmitter, a baseband signal is summed with the control voltage intended for the VCO and output by the loop filter, hence forming a modulator. The output of the summer 44 is input to the VCO 42.

Note that synthesized VCO loops comprising the PLL 46, loop filter 48, summer 44 and VCO 42 are well known in the art. One skilled in the art could modify or substitute the circuit shown in FIG. 2 with other equivalent configurations without departing from the scope of the present invention.

The output of the VCO 42 is optionally input to an equalizer 40 that functions to obtain the desired power levels for the various harmonics generated by the VCO 42. The output of the VCO comprises the fundamental frequency and N harmonics. The equalizer can be constructed to equalize any or all of the harmonic frequencies output by the VCO. The equalizer is added to the VCO output in order to generate higher harmonic products which are utilized as the carrier frequency for transmission and as one or more local oscillator signals for receiving.

The Tx data signal comprises logic levels properly adjusted so as to achieve the desired frequency deviations in the modulated signal output by the transmitter. In the case of FSK, the Tx data signal is added onto the control signal at the tuning port of the oscillator that is described in more detail hereinbelow.

The resultant modulation bandwidth at the output of the transmitter is multiplied by the transmitter path multiplication ratio. In the example presented herein, the transmitter path multiplication ratio is equal to 3. In other words, the frequency modulation bandwidth on the third harmonic output by the VCO is three times wider than that produced by the data signal using the fundamental frequency of the VCO.

During transmission, the VCO 42 is modulated by the Tx data signal. The transmitted frequency is the center frequency of the VCO multiplied by an integer factor K. The transmitted carrier frequency may be expressed by the multiplication shown below in Equation 1.

$$F_{TX} = K \cdot F_{FUND} \quad (1)$$

where $F_{TX}$ is the frequency of the transmitter output $F_{FUND}$ is the fundamental frequency of the VCO K is the ratio between the transmit frequency and the fundamental frequency of the VCO.

The modulated and multiplied product of the VCO is then amplified via power amplifier (FIG. 1) and applied to the antenna through a switch, which enables the receiver and transmitter to share a single antenna and band pass filter.

During reception, the VCO is not modulated, and the first and second local oscillator signals are generated using the harmonic products output of the VCO to provide total frequency conversion that converts the received frequency to the center frequency of the demodulator 34 (FIG. 1).

Note that the present invention is not limited to transceivers having a particular number of conversions. The use of more than one frequency conversion in the receiver, as utilized in the transceiver example presented herein, however, provides improved suppression of interference and improved image frequency rejection.

The frequency to which the receiver is tuned can be expressed by the sum shown below in Equation 2.

$$F_{REC} = M \cdot F_{FUND} + N \cdot F = F_{IF} \quad (2)$$

where

M and N are integers and $F_{REC}$ is the received frequency $F_{FUND}$ is the fundamental frequency of the VCO $M \cdot F_{FUND}$ is the first local oscillator frequency $N \cdot F_{FUND}$ is the second local oscillator frequency $F_{IF}$ is the intermediate frequency (IF), i.e., demodulator frequency Note that $F_{REC}$ represents the received frequency when the transceiver performs double conversion with lower side injection in both conversions. One skilled in the art, however, can apply the present invention to a transceiver with any number of conversions, and employ upper side injections as well.

During the time the transceiver is receiving, the modulation port is inactive. With reference to FIG. 1, the received signal is delivered from the antenna, through the switch to the LNA, then filtered and converted to the first Intermediate Frequency (IF) via mixer 24. The signal output of the mixer is then filtered again and converted by the second mixer 28 to the second IF which is also the frequency of the demodulator.

The demodulator functions to demodulate the converted signal to yield the original baseband signal. Since reception and transmission do not occur simultaneously, the same synthesized VCO may be used for both. During the time the transceiver is transmitting, the synthesized VCO is programmed (via the digital control input) to generate a frequency as expressed in Equation 3:

$$F_{SYNTH} = \frac{F_{TX}}{K} \quad (3)$$

In the transceiver example presented herein, the value of K is equal to 3. During the time the transceiver is receiving, the synthesized VCO is programmed to generate a frequency as expressed in Equation 4 below.

$$F_{SYNTH} = \frac{F_{REC} - F_{IF}}{M + N} \quad (4)$$

Figure 3:
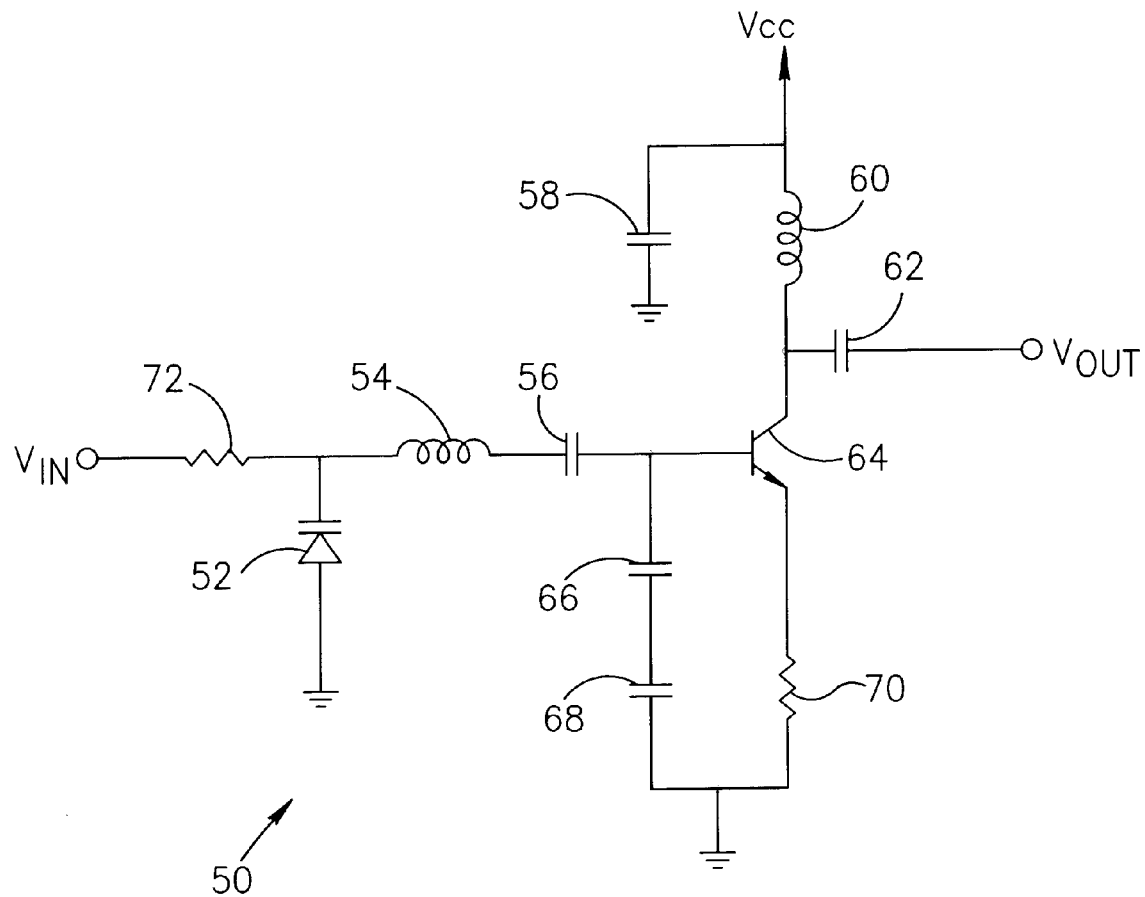
FIG. 3 is a schematic diagram illustrating an example implementation of the voltage controlled oscillator in more detail.

A schematic diagram illustrating an example implementation of the voltage controlled oscillator in more detail is shown in FIG. 3. The VCO circuit, generally referenced 50, comprises two resonators adapted to produce oscillations. The output of the summer 44 (FIG. 2) is input to the $V_{in}$ terminal. The signal is coupled via resistor 72 to a resonator comprising inductor 54 and varactor 52. The signal is input through capacitor 56 to the base of NPN transistor 64 and to the combination of capacitors 66, 68. The emitter of transistor 64 is connected to ground via resister 70. The collector is connected to a resonator comprised of inductor 60 and capacitor 62, while capacitor 58 connected to ground provides filtering. The two resonators in the VCO 50 are constructed so that their respective resonant frequencies are skewed and do not overlap.

Figure 4:
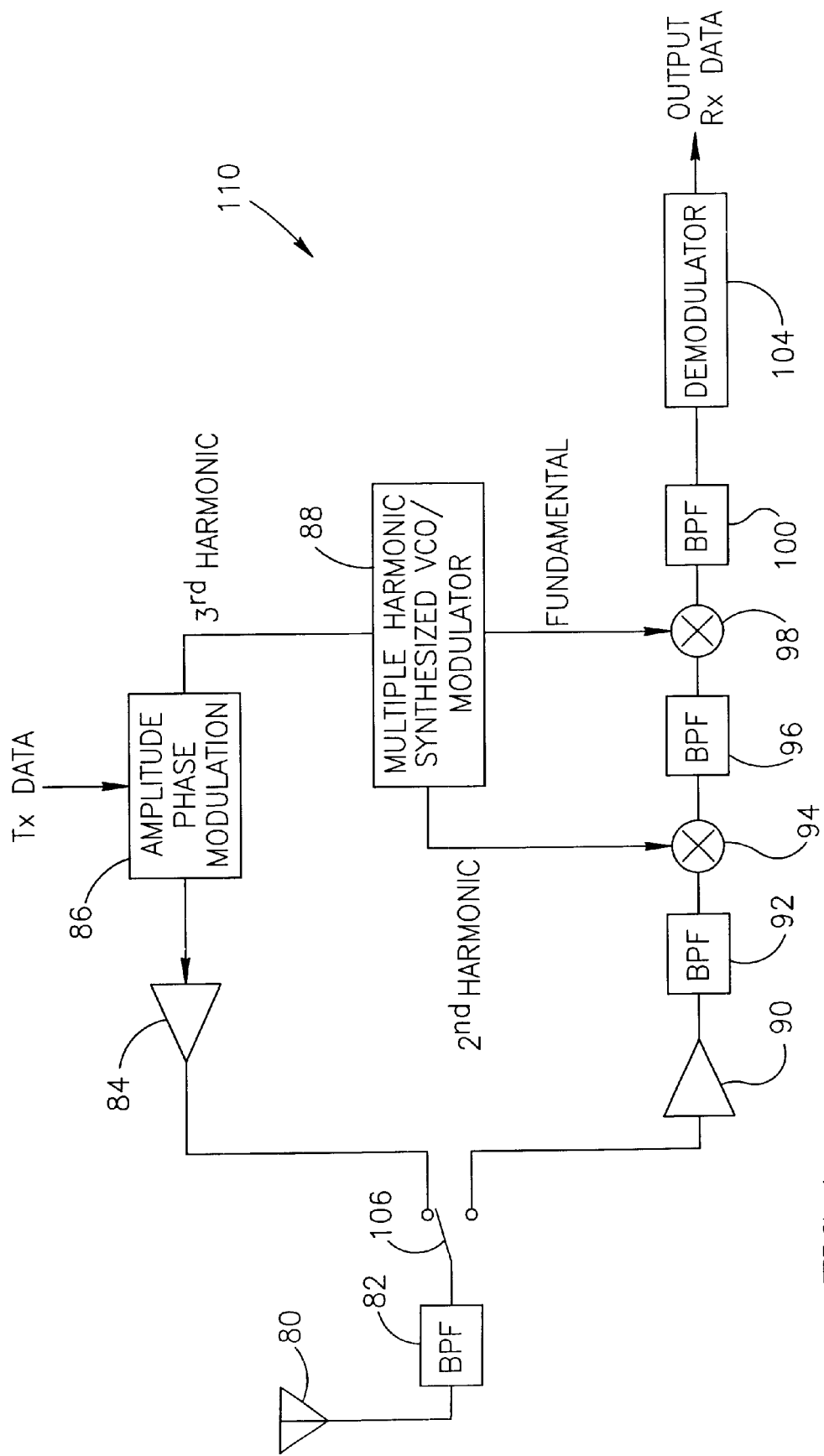
FIG. 4 is a block diagram illustrating a BPSK transceiver utilizing a single oscillator constructed in accordance with the present invention.

A block diagram illustrating an FSK transceiver utilizing a single oscillator constructed in accordance with the present invention is shown in FIG. 4. The transceiver, generally referenced 110, comprises a transmit portion and a receive portion. The multiple harmonic synthesized VCO/modulator component 88 is shared by both transmit and receive portions. The transceiver 110 is similar in construction to the transceiver of FIG. 1, the difference being the addition of a modulator 86 adapted to perform some type of amplitude shift keying (ASK) or phase shift keying (PSK), e.g., BPSK, QPSK, QAM, etc. In addition, the transmit portion comprises a power amplifier 84.

The data to be transmitted, i.e., Tx data, is input to the modulator 86. The output of the modulator is generated utilizing the $3^{rd}$ harmonic of the output of the single oscillator as the carrier signal for the transmitter. The modulated signal is input to power amplifier 84. The output of the power amplifier is input to the single pole double throw switch 106 which functions to switch the coupling of the antenna 80 between the receive portion and the transmit portion of the transceiver 110. The antenna is coupled to the switch 106 via BPF 82.

The receive signal path of the transceiver 110 comprises the antenna 80, BPF 82, switch 106, low noise amplifier (LNA) 90, BPF 92, down converter (mixer) 94, first intermediate frequency (IF) BPF 96, second mixer 98, second IF BPF 100 and demodulator 104. Note that the demodulator 104 is adapted to be appropriate for the type of modulation employed by the transceiver. The second harmonic frequency of the output of the single oscillator is used as the local oscillator signal for the down converter mixer 94. The fundamental frequency of the output of the single oscillator is used as the local oscillator signal for the second mixer 98.

While the invention has been described with respect to a limited number of embodiments, it will be appreciated that many variations, modifications and other applications of the invention may be made.

What is claimed is:

1. A time division duplex (TDD) transceiver, comprising:
   oscillation means for generating a fundamental frequency and a plurality of harmonic frequencies based thereon utilizing a single voltage controlled oscillator (VCO);
   transmitter means for generating a transmit output signal in accordance with a Tx data input signal and one or more carrier signals derived from said harmonic frequencies; and
   receiver means for receiving and demodulating a received signal and generating an Rx output signal in response thereto, said receiver means utilizing one or more local oscillator signals derived from said fundamental frequency and said harmonic frequencies.

2. The transceiver according to claim 1, wherein said oscillation means comprises:
   a frequency synthesizer coupled to the output of said VCO, said frequency synthesizer having a control input and a reference input;
   a loop filter connected to the output of said frequency synthesizer;
   an adder for receiving said Tx data input and for generating a control signal input to said VCO; and
   wherein said VCO is adapted to generate said fundamental frequency and said plurality of harmonic frequencies.

3. The transceiver according to claim 1, wherein said oscillation means comprises:
   a frequency synthesizer coupled to the output of said VCO, said frequency synthesizer having a control input and a reference input;
   a loop filter connected to the output of said frequency synthesizer;
   an adder for receiving said Tx data input and generating a control signal input to said VCO; and
   an equalizer coupled to the output of said VCO for providing the desired frequency spectra output for said fundamental frequency and said plurality of harmonic frequencies.

4. The transceiver according to claim 1, wherein said oscillation means comprises:
   a frequency synthesizer coupled to the output of said VCO, said frequency synthesizer having a control input and a reference input;
   a loop filter connected to the output of said frequency synthesizer, said loop filter operative to generate a control signal input to said VCO; and
   wherein said VCO is adapted to generate said fundamental frequency and said plurality of harmonic frequencies.

5. The transceiver according to claim 1, wherein said oscillation means comprises:
   a frequency synthesizer coupled to the output of said VCO, said frequency synthesizer having a control input and a reference input;
   a loop filter connected to the output of said frequency synthesizer, said loop filter operative to generate a control signal input to said VCO; and
   an equalizer coupled to the output of said VCO for providing substantially flat frequency response output for said fundamental frequency and said plurality of harmonic frequencies.

6. The transceiver according to claim 1, wherein said transmitter means is adapted to generate an FSK signal.

7. The transceiver according to claim 1, wherein said transmitter means is adapted to generate a BPSK signal.

8. The transceiver according to claim 1, wherein said transmitter means is adapted to generate a Quadrature Phase Shift Keying (QPSK) signal.

9. The transceiver according to claim 1, wherein said transmitter means is adapted to generate a Quadrature Amplitude Modulation (QAM) signal.

10. A time division duplex (TDD) transceiver, comprising:
    oscillation means for generating a fundamental frequency, and one or more harmonic frequencies, wherein said oscillation means employs a single voltage controlled oscillator (VCO);
    transmitter means for generating a transmit output signal modulated by a Tx data input signal, said transmitter means utilizing one of said harmonic frequencies output of said oscillation means; and
    receiver means for receiving and demodulating a received signal so as to generate an Rx output signal therefrom, said receiver means utilizing said fundamental frequency and said one or more harmonic frequencies output from said oscillation means.

11. The transceiver according to claim 10, wherein said transmitter means is adapted to generate an FSK signal.

12. The transceiver according to claim 10, wherein said transmitter means is adapted to generate a Binary Phase Shift Keying (BPSK) signal.

13. The transceiver according to claim 10, wherein said transmitter means is adapted to generate a Quadrature Phase Shift Keying (QPSK) signal.

14. The transceiver according to claim 10, wherein said transmitter means is adapted to generate a Quadrature Amplitude Modulation (QAM) signal.

15. The transceiver according to claim 10, wherein said transmitter means is adapted to modulate said Tx data input signal using a third harmonic frequency as a carrier signal.

16. The transceiver according to claim 10, wherein receiver means comprises:

means for mixing said receive signal with a first local oscillator signal comprising a second harmonic frequency to generate a first intermediate frequency (IF); and means for mixing said first IF receive signal with a second local oscillator signal comprising said fundamental frequency.

17. A method of sharing the output of a single oscillator for both transmission and reception in a time division duplex (TDD) transceiver, said method comprising the steps of:

generating a fundamental frequency and a plurality of harmonic frequencies utilizing a single oscillator source;

modulating data to be transmitted utilizing one or more of said harmonic frequencies; and downconverting a receive signal utilizing said fundamental frequency and one or more of said harmonic frequencies.

18. The method according to claim 17, wherein said step of modulating comprises modulating said data to be transmitted using a third harmonic frequency as a carrier signal.

19. The method according to claim 18, wherein said third harmonic frequency is substantially 2.4 GHz.

20. The method according to claim 17, wherein said step of downconverting comprises:

mixing said receive signal with a first local oscillator signal comprising a second harmonic frequency to generate a first intermediate frequency (IF); and mixing said first IF receive signal with a second local oscillator signal comprising said fundamental frequency to generate a second IF signal.

21. The method according to claim 20, wherein said receive signal has a frequency of substantially 2.4 0Hz, second harmonic frequency is substantially 1598 MHz and said fundamental frequency is substantially 799 MHz, resulting in a second IF signal of substantially 3 MHz.

* * * * *